United States Patent [19]
Willmering et al.

[11] Patent Number: 5,884,466
[45] Date of Patent: Mar. 23, 1999

[54] PLASTIC DECK LINER FOR LAWN MOWER

[75] Inventors: William G. Willmering, Chapin; Linton L. Lewis, Orangeburg; Nathaniel Smith, Columbia; Eric R. Walker, Orangeburg, all of S.C.

[73] Assignee: White Consolidated Industries, Inc., Cleveland, Ohio

[21] Appl. No.: 795,811

[22] Filed: Feb. 5, 1997

[51] Int. Cl.[6] .................................................. A01D 34/82
[52] U.S. Cl. .................................. 56/320.1; 56/DIG. 20; 56/DIG. 24
[58] Field of Search ................................ 56/320.1, 320.2, 56/17.4, 1, DIG. 9, DIG. 20, DIG. 22, DIG. 24

[56] References Cited

U.S. PATENT DOCUMENTS

| | | |
|---|---|---|
| D. 250,027 | 10/1978 | Jackson . |
| D. 254,008 | 1/1980 | Jackson . |
| D. 316,265 | 4/1991 | Mihatsch . |
| 3,646,739 | 3/1972 | Dahl . |
| 3,797,212 | 3/1974 | Pursel . |
| 4,189,903 | 2/1980 | Jackson et al. . |
| 4,899,526 | 2/1990 | Harris . |
| 5,129,217 | 7/1992 | Loehr . |
| 5,184,451 | 2/1993 | Spavipakka et al. . |
| 5,638,668 | 6/1997 | Kallevig et al. ........................ 56/320.1 |

*Primary Examiner*—Terry Lee Melius
*Attorney, Agent, or Firm*—Pearne, Gordon, McCoy & Granger LLP

[57] ABSTRACT

A lawn mower including a deck having an inner surface forming a cutting chamber, a cutting blade disposed within the cutting chamber, a drive motor for rotating the cutting blade within the cutting chamber, and a separate wear-resistant liner removably attached to the deck and covering at least a portion of the inner surface of the deck. The liner conforms to the shape of the deck and is formed of a wear-resistant plastic material which substantially increases the life of the deck under abrasive conditions such as sandy soil. Other embodiments are disclosed wherein an integral layer of wear-resistant plastic is formed directly on the inner surface of the deck and wherein a separate rigid liner having an integral layer of wear-resistant plastic formed directly thereon is removably attached to the inner surface of the deck. The wear-resistant plastic is preferably a urethane polymer or a polyurethane elastomer.

18 Claims, 4 Drawing Sheets ic Deck Liner for Lawn Mower

BACKGROUND OF THE INVENTION

The present invention generally relates to lawn mowers and, more specifically, to lawn mowers having wear-resistant decks.

Lawn mowers typically have a housing or deck in which a cutting blade cuts the lawn. The lawn mower decks rapidly wear out in areas having lawns with sand intermixed in the soil. The sand or other material is thrown from the cutting blades against the interior surface of the decks and tends to abrade or "sand-blast" the decks until holes are worn completely through the decks. In areas having little or no sand in the soil, such as Midwest portions of the U.S., mower decks can be used for about 800 or more hours without wearing out. In areas having sand in the soil, the life of the deck depends on the sand type, the amount of sand in the soil, and the density of the lawn. In some areas of South Carolina, mower decks wear out after about 230 hours. In some areas of Florida, mower decks wear out in as little as 60–150 hours resulting in replacement of the decks as many as two times per year. Accordingly, there is a need for increasing the life of mower decks.

BRIEF SUMMARY OF THE INVENTION

The present invention provides a lawn mower which overcomes at least some of the above noted problems. According to the present invention, a lawn mower includes, a deck having an inner surface forming a downward facing cutting chamber, a cutting blade disposed within the cutting chamber, a drive motor operably connected to the cutting blade for rotating the cutting blade within the cutting chamber, and a wear-resistant layer covering at least a portion of the inner surface of the deck. The wear-resistant layer is formed of a wear-resistant material for substantially increasing the life of the deck under abrasive conditions. The wear-resistant material is preferably a wear-resistant plastic such, as for example, a urethane polymer or a polyurethane elastomer. In one embodiment of the present invention, the wear-resistant layer is a separate wear-resistant liner attached to the deck and formed of a wear-resistant material. Preferably, the separate liner is generally rigid and generally conforms to the shape of the deck. In another embodiment of of the present invention, the wear-resistant layer is formed on the inner surface of the deck such as by directly spraying-on the wear-resistant material or by directly molding-on the wear-resistant material. In yet another embodiment of the present invention, the wear-resistant layer is a separate generally rigid liner attached to the deck and having the wear-resistant material formed on an inner side of the generally rigid liner. It is noted that the wear resistant layer of the present invention can be utilized with new, used, and even worn out lawn mower decks to increase the life of the decks.

BRIEF DESCRIPTION OF THE SEVERAL VIEWS OF THE DRAWING

These and further features of the present invention will be apparent with reference to the following description and drawings, wherein.

DETAILED DESCRIPTION OF THE INVENTION

Figure 1:
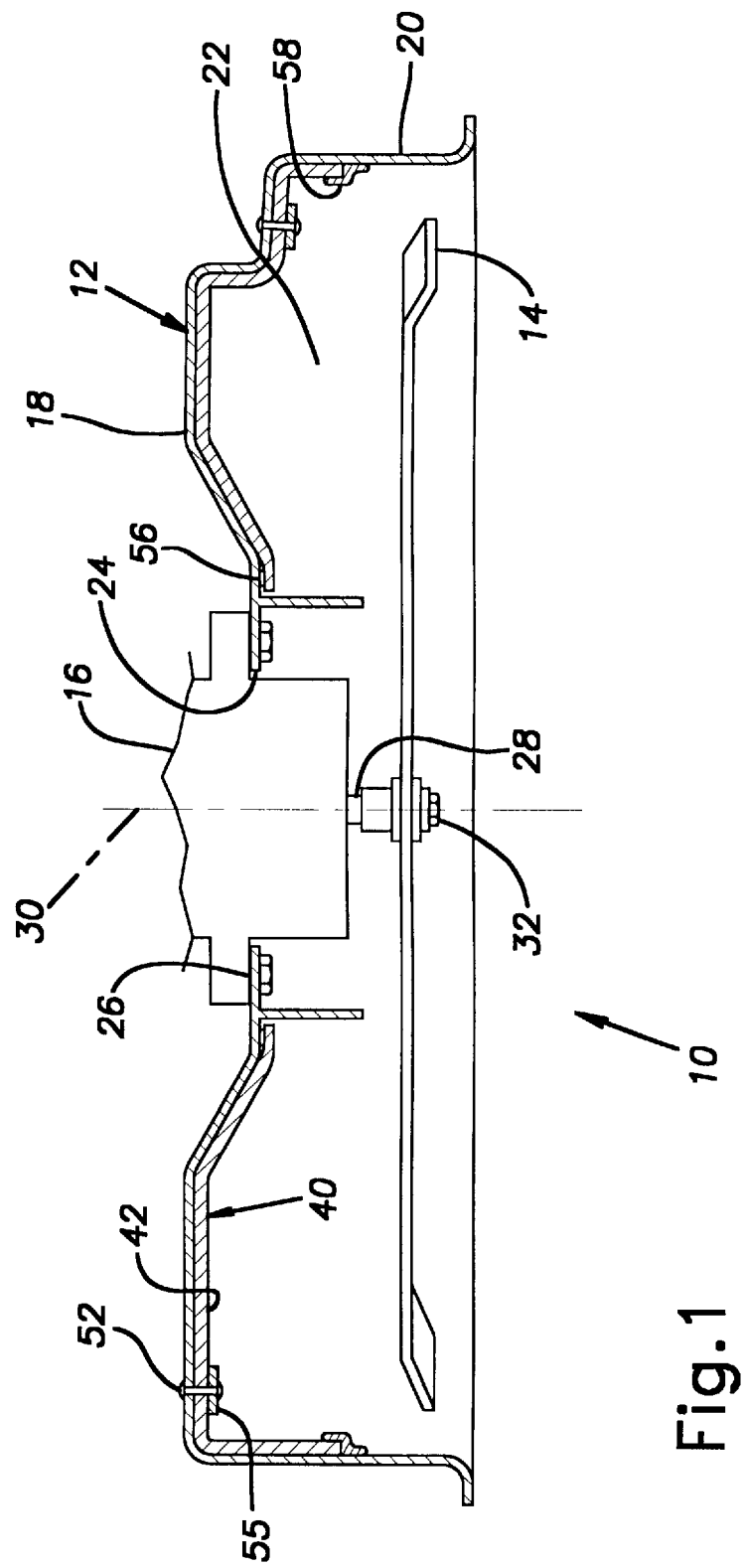
FIG. 1 is an fragmented elevational view, in cross-section, of a lawn mower having a deck according to a first embodiment of the present invention.

FIG. 1 illustrates a portion of a powered rotary lawn mower 10 embodying to the present invention. The lawn mower 10 includes a housing or deck 12, a cutting blade 14, and a drive motor 16. With a walk-behind-type mower, the deck 12 is typically supported at its front and rear ends by wheels or casters (not shown for clarity) and has a handle (not shown for clarity) for pushing the deck 12 over the ground. Alternatively with a tractor-type mower, the deck 12 is typically supported by or suspended from a power driven tractor (not shown for clarity).

The deck 12 includes a generally horizontal top wall 18 and a generally vertical side wall 20 which downwardly extends from the outer periphery of the top wall 18. The inner surfaces of the walls 18, 20 form a downwardly facing cutting chamber 22. The deck 12 is typically formed of a metal having a thickness in the range from about 0.070 inches to about 0.120 inches. The top wall 18 has an opening 24 formed therein. Around the opening 24 extends a hub or platform 26 for supporting a drive shaft 28 which downwardly extends through the opening 24 into the cutting chamber 22. The drive shaft 28 rotates on a substantially vertical axis of rotation 30.

The drive motor 16 is typically supported by the top wall 18 of the deck 12 and operably connected to the drive shaft 28 for rotation of the drive shaft 28. While the illustrated drive motor 16 is directly connected to the drive shaft 28, it is noted that the drive motor 16 can be connected to the drive shaft 28 in other suitable manners. For multi-blade lawn mowers, in particular, the drive motor 16 can be advantageously connected to multiple drive shafts by belts and pulleys. The drive motor 16 can be of any suitable type such as, for example, an internal combustion engine or an electric motor.

The cutting blade 14 is rigidly but removably attached to the lower end of the drive shaft 28 by a bolt 32 so that the cutting blade 14 rotates with the drive shaft 28. The cutting blade 14 is shaped and oriented to rotate within the cutting chamber 22 in a plane generally parallel to the ground and generally perpendicular to the axis of rotation 30. The cutting blade 14 can be either a conventional or mulching type cutting blade.

The side wall 20 of the deck 12 generally surrounds the path of the cutting blade 14. The side wall 20 is outwardly spaced from the ends of the cutting blade 14 and downwardly extends below the cutting blade 14 so that the cutting blade 14 is spaced slightly above the bottom edge of the side wall 20. The side wall 20 has a height sized to ensure adequate space between the cutting blade 14 and the top wall 18 of the deck 12 to permit grass clippings, cut by the cutting blade 14, to flow around the cutting chamber 22 above the cutting blade 14 and outwardly through a discharge opening 34 (best shown in FIGS. 2 and 3) formed in the side wall 20.

A guide chute (not shown) is often fitted at the discharge opening 34 (FIGS. 2 and 3) to direct the clippings outwardly in a relatively confined, high-velocity, stream. Such guide chutes normally have provisions for attachment of a bag for collecting the clippings when it is desired to do so. The guide chute may be separately formed or, alternatively, all or portions of the guide chute may be integrally formed with the deck 12.

Figure 2:
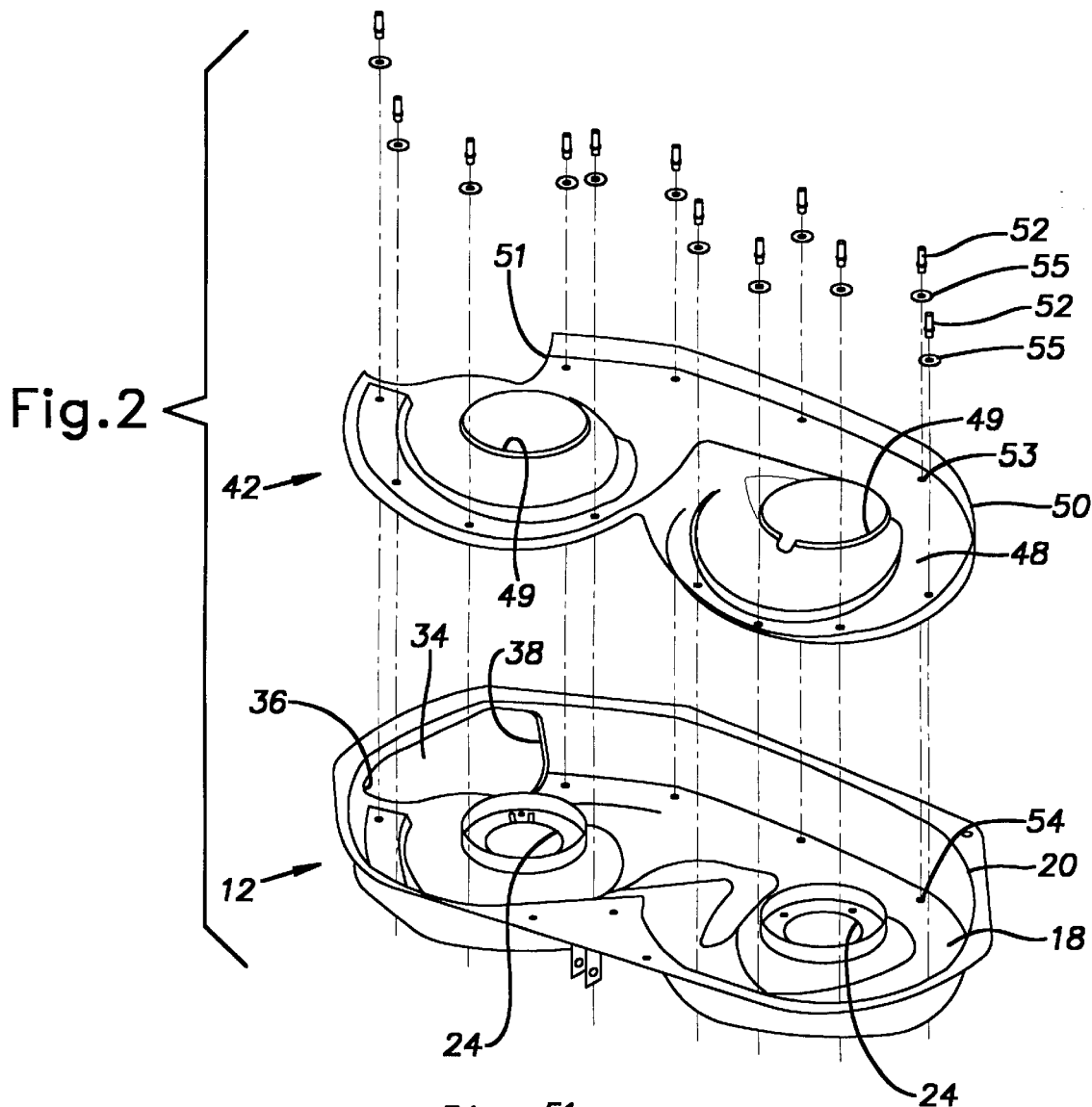
FIG. 2 is a an exploded perspective view of a deck and liner for a multi-blade lawn mower according to the present invention.
Figure 3:
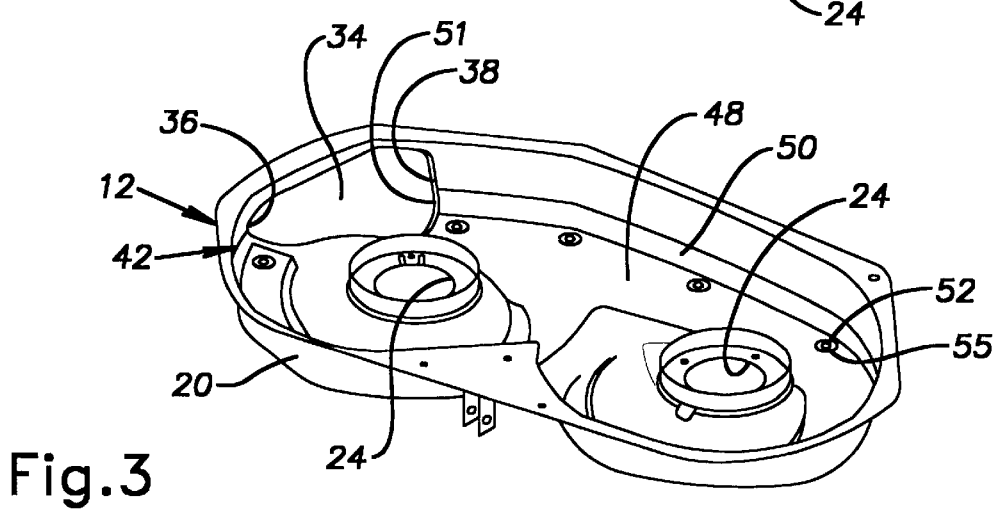
FIG. 3 is a perspective view of the deck and attached liner of FIG. 2.

The portion of the top wall 18 of the deck 12 located between the hub 26 and the side wall 20 generally forms a. compound-curve and typically varies in height around the deck 12 (best shown in FIGS. 2 and 3). The deck 12 typically commences with a low point near the rear or trailing edge 36 of the discharge opening 34 and gradually increases to a maximum height at the front or leading edge 38 of the discharge opening 34. Such a contoured shape facilitates a lifting or vacuum action of the cutting blade 14 on air current and entrained clippings while, at the same time, effectively preventing air current and entrained clippings from circulating in a continuous path around the interior of the deck 12 by directing and guiding the stream of air and clippings out through the discharge opening 34.

The cutting chamber 22 is provided with a layer of wear-resistant material 40 at the inner surface of the deck 12. The wear-resistant layer 40 can cover substantially the entire inner surface of the deck 12 or alternatively can cover only a portion of the inner surface of the deck 12. For example, the wear-resistant layer 40 can be a patch or patches covering only areas which are prone to high rate of wear. The illustrated wear-resistant layer 40 covers substantially all of the inner surface of the deck 12. The illustrated wear-resistant layer 40 extends across the inner surface of the deck upper wall 18 from near the hub 26 to the side wall 20 and down the inner surface of the deck side wall to a position slightly above the cutting blade 14. Alternately, the wear-resistant layer 40 could extend down the inner surface of the deck side wall 20 to the bottom edge of the deck side wall 20 or even wrap around the bottom edge of the deck side wall 20.

The wear-resistant layer 40 is formed from a wear-resistant material which substantially increases the life of the deck 12, that is, at least doubles the life of the deck 12 and preferably at least triples the life of the deck 12. It is noted that the wear-resistant material must additionally be durable enough to withstand the operating conditions of the lawn mower 10. The wear-resistant material is preferably a wear-resistant plastic such as, for example, a urethane polymer or a polyurethane elastomer. Suitable additives or fillers to increase wear resistance could be, for example, molybdenum disulfide, graphite, and TEFLON. A urethane elastomer which provides particularly good wear resistance is RHINO-HYDE (95A), available from Tandem Products, Minneapolis, Minn. It is believed that a high density polyethylene (HDPE) with carbon black or graphite and a acrylonitrile-butadiene-styrene (ABS) may provide acceptable results.

Figure 4:
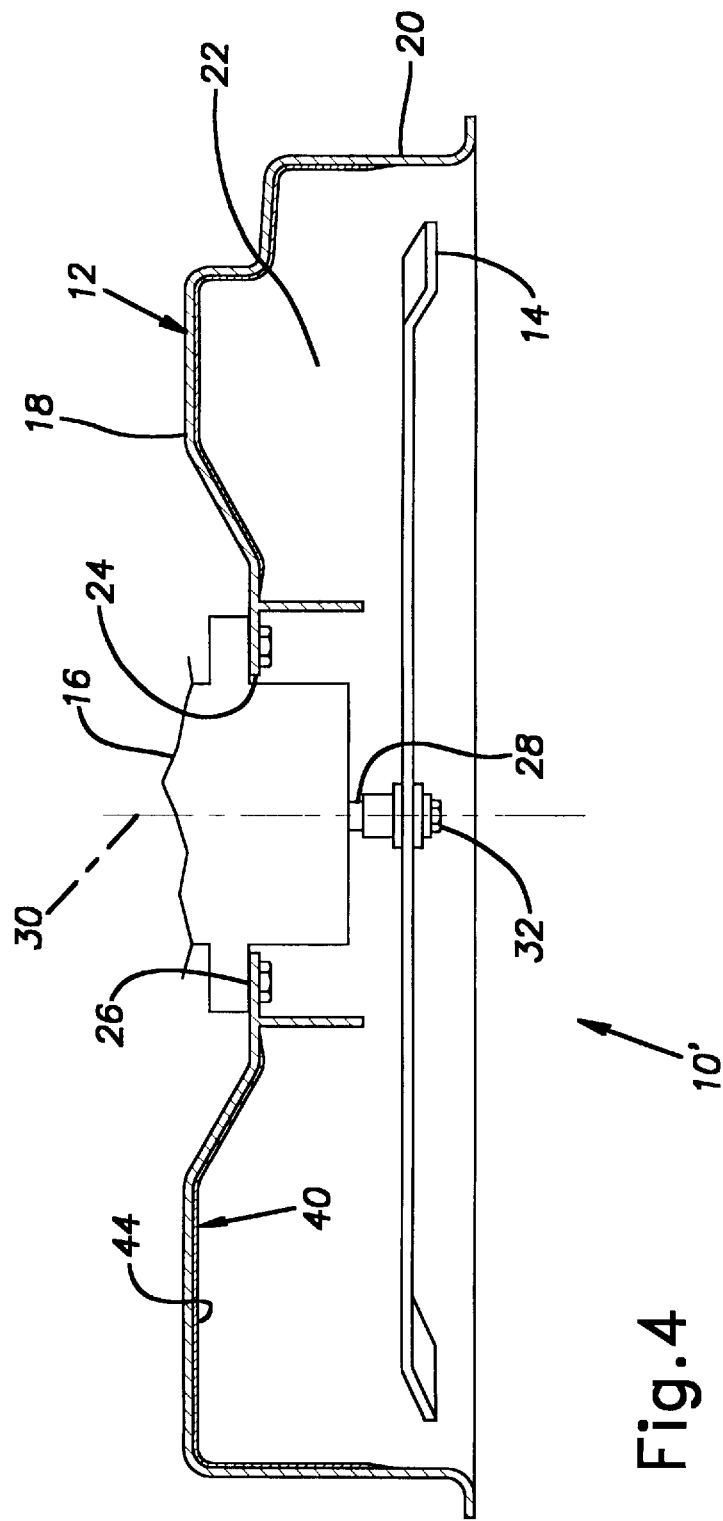
FIG. 4 is an fragmented elevational view, in cross-section, of a lawn mower having a deck according to a second embodiment of the present invention.
Figure 5:
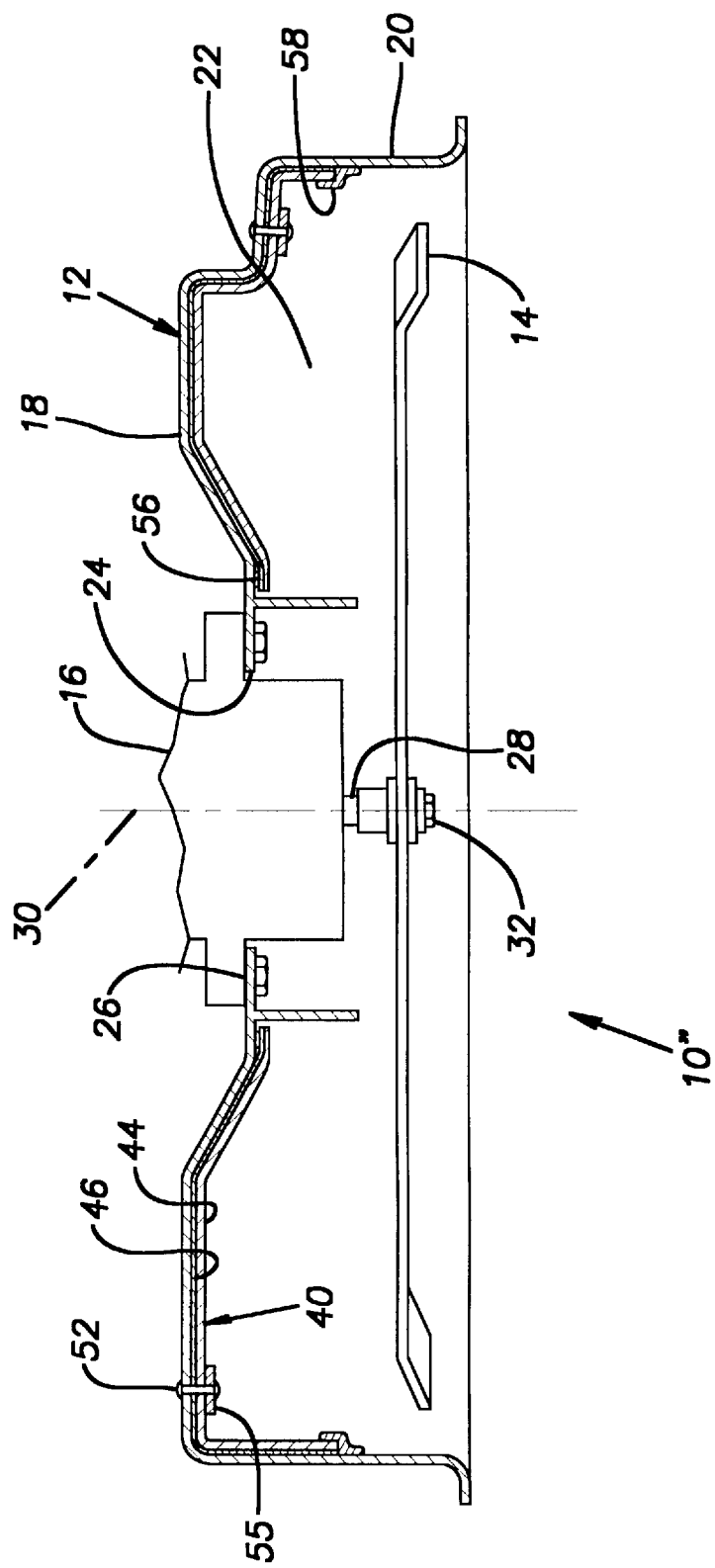
FIG. 5 is an fragmented elevational view, in cross-section of a lawn mower having a deck according to a third embodiment of the present invention.

The wear-resistant layer 40 can be either a separate wear-resistant liner 42 attached to the inner surface of the deck 12 (shown in FIGS. 1–3), an integral or adhered wear-resistant layer 44 on the inner surface of the deck 12 (shown in FIG. 4), or a rigid liner 46 attached to the deck 12 with an integral or adhered wear-resistant layer 44 on the inner surface of the rigid liner 46 (shown in FIG. 5). An advantage of the separate wear-resistant liner 42 and the rigid liner 46 with the integral wear resistant layer 42 is that they can be easily added to used and worn out decks.

FIGS. 2 and 3 illustrate the deck 12 and the separate wear-resistant liner 42 adapted for a multi-blade mower. The separate wear-resistant liner 42 can be formed from any suitable manner such as, for example, injection molding, vacuum forming, or casting. The separate wear-resistant liner 42 is preferably formed from a single mass of material. The illustrated separate wear-resistant liner 42 includes a top panel 48 and a downwardly depending skirt 50 about the periphery of the top panel 48. Openings 49 are formed in the top panel 48 to cooperate with the openings 24 in the top wall 18 of the deck 12. A cut-out 51 is formed to cooperate with the discharge opening of the deck 12. The separate wear-resistant liner 42 is shaped to closely conform to the inner surface of the deck 12 so that the liner 42 has little, and preferably, no affect on the aerodynamic performance of the deck 12.

The separate wear-resistant liner 42 should be substantially rigid so that there is little, if any, flexure during operation of the mower 10. Flexure of the liner 42 during operation of the mower 10, will change the shape of the liner 42, and the cutting chamber 22, which can affect the aerodynamic performance of the deck 12. If the flexure of the liner 42 is large enough, the liner 42 can move into the path of the cutting blade 14 which can damage the liner 42 and/or the cutting blade 14. It has been found that the thickness of the liner 42 is preferably in the range from about 50% to about 150% the thickness of the walls 18, 20 of the deck 12 in order to obtain the required rigidity. Therefore, the liner 42 preferably has a thickness in the range of about 0.100 inches to about 0.200 inches.

The separate wear-resistant liner 42 is preferably attached to the deck 12 with fasteners 52 such as, for example, rivets, bolts, screws, coil springs, or clips, so that the liner can be removed and/or replaced. It is noted that the liner 42 can alternatively be attached to the deck 12 by other methods such as, for example, bonding with adhesives. The illustrated liner 42 is attached to the deck 12 with twelve rivets 52 which are spaced about the periphery of the top wall 18 of the deck 12. It is noted that other quantities and/or other locations of the fasteners 52 could be utilized. The liner 42 is preferably provided with preformed openings 53 for the fasteners 52. The openings 53 in the liner 42 can be conveniently used as a template for drilling openings 54 for the fasteners 52 in the deck 12. As shown in FIGS. 1–3, washers 55 are preferably provided for each rivet 52 at the liner 42 to increase the bearing surface. Attached in this manner, the separate wear-resistant liner 42 is easily added to existing lawn mowers and is readily removable for repair or replacement.

The edges of the liner 42 are preferably sealed to prevent debris such as grass clippings from wedging between the deck 12 and the liner 42. As shown in FIG. 1, there is preferably a first bead 56 of sealant located between top wall 18 of the deck 12 and the top panel 48 of the liner 42 around the hub 26 and a second bead 58 of sealant over the lower edge of the skirt 50 of the liner 42 to the side wall 20 of the deck 12. The sealant can be of any suitable type such as, for example, a silicone sealant.

FIG. 4 illustrates a powered rotary lawn mower 10' according to a second embodiment of the present invention wherein like reference numbers are used for like structure. The lawn mower 10' is similar to the lawn mower 10 of FIG. 1, except that the wear-resistant layer 40 is an integral wear-resistant layer 44. The integral wear-resistant layer 44 can be formed in any suitable manner such as, for example, spraying or directly molding-on the wear-resistant material. The deck 12 must be of a material suitable for adherence of the integral wear-resistant layer 44 thereto such as, for example, any metal or rigid plastic.

The integral wear-resistant layer 44 inherently conforms to the shape of the deck 12 and therefore does not affect the aerodynamic performance of the deck 12. The thickness of the integral wear-resistant layer 44 can be advantageously less than the thickness of the above described separate liner 42 because the integral wear-resistant layer 44 will not flex more than the deck 12 itself and thus is inherently rigid. Accordingly, material costs are reduced because less wear-resistant material is required.

FIG. 5 illustrates a powered rotary lawn mower 10" according to a third embodiment of the present invention wherein like reference numbers are used for like structure. The lawn mower 10" is similar to the lawn mower of FIG. 1, except that the wear-resistant layer is a rigid liner 46 having an integral wear-resistant layer 44. The rigid liner 46 is the same as the separate wear-resistant liner 42 discussed above except that it is formed from a material which inexpensive relative to the wear-resistant material and suitable for proper adherence of the integral wear-resistant layer 44. The rigid liner 46 provides the required rigidity so that the integral wear-resistant layer 44 can be applied, with a thickness less than the thickness of the separate wear-resistant liner 42, to reduce the amount of wear-resistant material required. The rigid liner 46 having an integral wear-resistant layer 44 is easily added to existing lawn mowers and is readily removable for repair or replacement.

Although particular embodiments of the invention have been described in detail, it will be understood that the invention is not limited correspondingly in scope, but includes all changes and modifications coming within the spirit and terms of the claims appended hereto.

What is claimed is:

1. A lawn mower comprising:
   a deck having an inner surface forming a downward facing cutting chamber, said deck comprised of a metal having a thickness of at least about 0.070 inches;
   a cutting blade disposed within said cutting chamber;
   a drive motor operably connected to said cutting blade for rotating said cutting blade within said cutting chamber; and
   a wear-resistant layer covering at least a portion of said inner surface of said deck and formed of a wear-resistant material for substantially increasing the life of said deck under abrasive conditions, wherein said wear-resistant material is a wear-resistant plastic and said wear-resistant layer closely conforms to said inner surface of said deck so that said wear-resistant layer has substantially no affect on aerodynamic performance of said deck.

2. The lawn mower according to claim 1, wherein said wear-resistant plastic is one of a urethane polymer, and a polyurethane elastomer.

3. The lawn mower according to claim 1, wherein said wear-resistant layer is a separate liner attached to said deck.

4. The lawn mower according to claim 3, wherein said separate liner is generally rigid and self supporting.

5. The lawn mower according to claim 3, wherein said separate liner is removably attached to said deck with fasteners.

6. The lawn mower according to claim 5, wherein said fasteners are rivets.

7. The lawn mower according to claim 1, wherein said wear-resistant layer is an integral layer of wear-resistant material formed on said inner surface of said deck.

8. The lawn mower according to claim 7, wherein said wear-resistant layer is sprayed wear-resistant material.

9. The lawn mower according to claim 7, wherein said wear-resistant layer is molded-on wear-resistant material.

10. The lawn mower according to claim 1, wherein said wear-resistant layer is a separate and generally-rigid liner attached to said deck and having an integral layer of wear-resistant material formed on an inner surface of said liner.

11. The lawn mower according to claim 1, wherein the substantial increase in the life of the deck under abrasive conditions is at least two times the life of the deck without the layer.

12. A lawn mower comprising:
    a deck having an inner surface forming a downward facing cutting chamber, said deck comprised of a metal having a thickness of at least about 0.070 inches;
    a cutting blade disposed within said cutting chamber;
    a drive motor operably connected to said cutting blade for rotating said cutting blade within said cutting chamber; and
    a wear-resistant liner attached to said deck and covering at least a portion of said inner surface of said deck, wherein said liner closely conforms to said inner surface of said deck so that said liner has substantially no affect on aerodynamic performance of said deck and said liner is formed of a wear-resistant plastic for substantially increasing the life of said deck under abrasive conditions.

13. The lawn mower according to claim 12, wherein said wear-resistant plastic is one of a urethane polymer, and a polyurethane elastomer.

14. The lawn mower according to claim 12, wherein the substantial increase in the life of the deck under abrasive conditions is at least two times the life of the deck without the layer.

15. A lawn mower comprising:
    a deck having an inner surface forming a downward facing cutting chamber, said deck comprised of a metal having a thickness of at least about 0.070 inches;
    a cutting blade disposed within said cutting chamber;
    a drive motor operably connected to said cutting blade for rotating said cutting blade within said cutting chamber; and
    a wear-resistant layer formed on at least a portion of said inner surface of said deck, wherein said layer closely conforms to said inner surface of said deck so that said liner has substantially no affect on aerodynamic performance of said deck and said layer is formed of a wear-resistant plastic for substantially increasing the life of said deck under abrasive conditions.

16. The lawn mower according to claim 15, wherein said wear-resistant plastic is one of a urethane polymer, and a polyurethane elastomer.

17. The lawn mower according to claim 16, wherein said wear-resistant layer is sprayed wear-resistant plastic.

18. The lawn mower according to claim 15, wherein the substantial increase in the life of the deck under abrasive conditions is at least two times the life of the deck without the layer.

* * * * *